United States Patent

Makihara et al.

[11] 3,967,050
[45] June 29, 1976

[54] STRAIN GROMMET

[75] Inventors: Chiharu Makihara, Kamakura; Tohru Yoda, Yokohama, both of Japan

[73] Assignees: Mitsubishi Electric Co.; Nifco Inc., both of Tokyo, Japan

[22] Filed: July 3, 1975

[21] Appl. No.: 592,850

[30] Foreign Application Priority Data

July 4, 1974  Japan................................ 49-78191

[52] U.S. Cl. ............................ 174/135; 24/115 R; 240/88; 248/56; 339/103 B
[51] Int. Cl.[2] .................... H01R 13/58; F21V 21/02
[58] Field of Search................. 174/61, 65 R, 65 G, 174/89, 135, 152 G, 153 G; 240/88; 248/56; 339/103 R, 103 B, 103 C; 24/115 R

[56] References Cited
UNITED STATES PATENTS
1,342,787  6/1920  White ............................... 240/88 X FOREIGN PATENTS OR APPLICATIONS
1,440,149  11/1968  Germany........................... 174/65 R Primary Examiner—Laramie E. Askin
Attorney, Agent, or Firm—J. R. Halvorsen; R. W. Beart

[57] ABSTRACT

Disclosed is a strain grommet for firmly holding one end of an electric cord. The grommet consists of a cylindrical body adapted to be opened and closed freely by means of an open cut therein and a hat-shaped fitting body. In use, the cylindrical body is fastened around the slit end of the cord and the unraveled portion of the covering braid is laid back over the outer surface of the cylindrical body. The hat-shaped fitting body is then pressed down over the cylindrical body thereby immobilizing said spread covering braid between the outer surface of the cylindrical body and the inner wall surface of the holding body.

8 Claims, 4 Drawing Figures

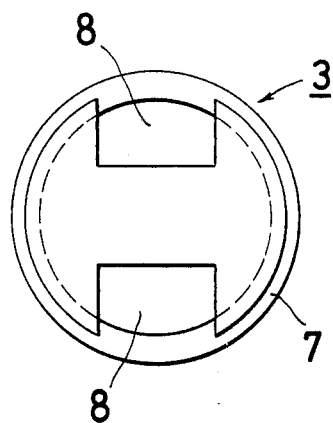
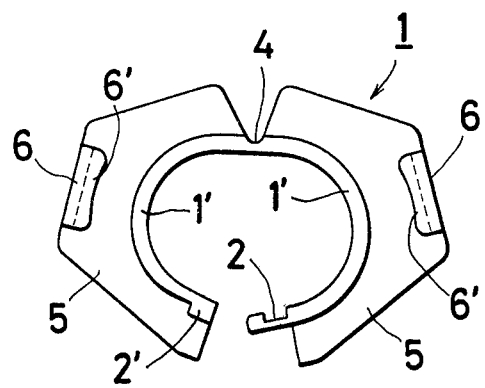
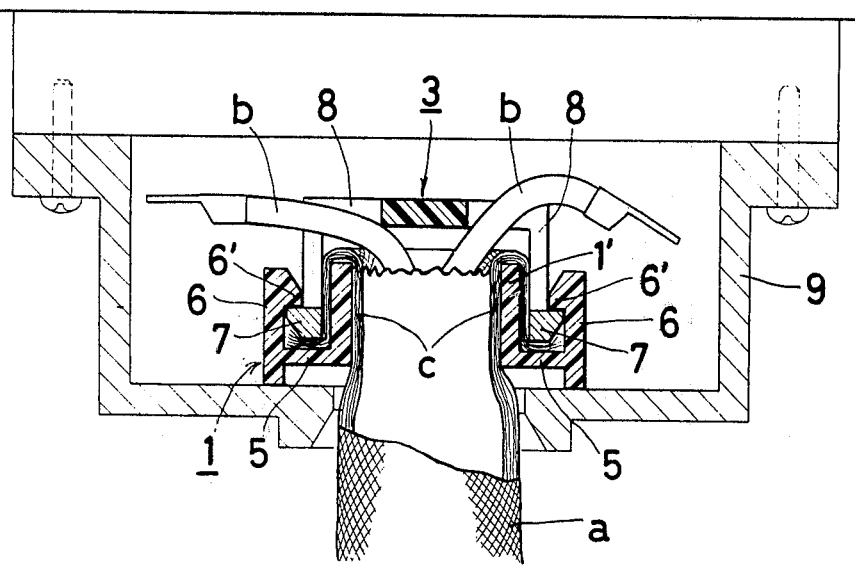

STRAIN GROMMET

BACKGROUND OF THE INVENTION

The present invention relates to a strain grommet of the type for firmly holding an electric cord to be used such as in suspending a pendant illuminating appliance.

When a pendant illuminating appliance is to be suspended from a ceiling surface, the suspension may at times be effected with the aid of supporting means such as a chain. In the case of an illuminating appliance having relatively light weight, the suspension may possibly be accomplished by having the cord itself serve as supporting means. Generally in this case, an insulating tape is wrapped around the end portion of the cord so as to trim the unraveled covering braid of the cord and at the same time form a bulge of said insulating tape in the shape of a fist generally positioned where the cord wires are forked out beyond the braid with the bulge preventing the cord from falling down through an opening, such as of a rosette. This is done with a view to precluding the possibility that the weight of the illuminating appliance will exert itself as a load directly upon the core strands of the cord alone rather than on the braid where the strain is intended to be applied. Since said wrapping of the insulating tape is generally effected by hand, this method suffers from inferior operational efficiency and proves unsuitable for mass production. It also has a disadvantage in that the unraveled covering braid requires troublesome trimming work and the finished cord length is likely to vary from cord to cord.

An object of the present invention is to provide a strain grommet for firmly holding the end portion of a cord, which grommet prevents the cord from otherwise possible loosening of the covering braid at the end portion of the cord and ensures excellent operational efficiency.

Another object of this invention is to provide a strain grommet which provides infallible hold of the end portion of a cord so that the end portion of the cord will never pull out from the grommet.

SUMMARY OF THE INVENTION

To accomplish the objects described above, the present invention provides a strain grommet which comprises a cylindrical body adapted to be opened and closed freely by breaking and making connection between an engaging tip and a stopping hook formed respectively on the opposed edges across an open cut made therein in the axial direction of the body so as to encircle the end portion of a cord, and a hat-shaped fitting body adapted to be set downwardly into position on said cylindrical body so as to enclose the periphery of said cylindrical body and at the same time permit supporting hooks provided on said cylindrical body to be brought into snapping engagement with a flange provided around an opening of the fitting body for thereby allowing the unraveled covering braid of said cord to be pressed and immobilized against the outer surface of the cylindrical body.

The strain grommet of this invention not only protects the cord against otherwise possible loosening of the covering braid thereof but also prevents the cord from being pulled out from the grommet under the weight of the object suspended by the cord since the unraveled covering braid of the cord is held fast in the limited space intervening between the outer surface of the cylindrical body and the inner wall surface of the fitting body as described above. This invention can be effected very simply because the only work required in its use consists of passing the end portion of the cord through the opening in the cylindrical body, laying the unraveled covering braid of the cord back over the outside periphery of the cylindrical body and subsequently setting the hat-shaped fitting body into position on said cylindrical body.

BRIEF EXPLANATION OF THE DRAWING

FIG. 2 is an enlarged plan view illustrating the fitting body of the strain grommet of FIG. 1.

FIG. 3 is an enlarged plan view illustrating the cylindrical body of the strain relief grommet of FIG. 1.

FIG. 4 is a central cross section illustrating a strain grommet according to the present invention in a state attached to the end portion of a cord.

DETAILED DESCRIPTION OF THE INVENTION

Figure 1:
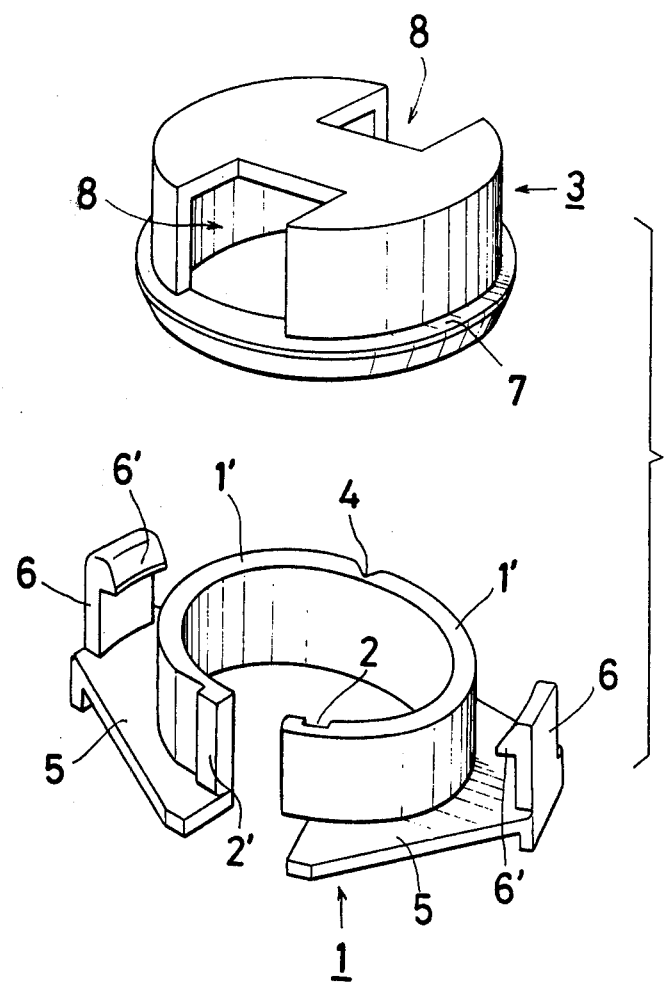
FIG. 1 is an enlarged perspective view illustrating in a separated state a cylindrical body and a fitting body in one preferred embodiment of the strain grommet according to the present invention.

With reference to FIGS. 1, 2 and 3, the strain grommet according to the present invention comprises a cylindrical body 1 and a fitting body 3. The cylindrical body 1 is a cylinder so adapted that the peripheral shell thereof can be opened along a cut made therein in the axial direction and can then be closed into a cylinder by bringing into mutual engagement an engaging tip 2 and a stopping hook 2' provided at the respective edges of the opened peripheral shell. The fitting body 3 is a hat-shaped body adapted to be set downwardly into position on said cylindrical body so as to enclose the peripheral shell of the cylindrical body.

Said cylindrical body 1 and said fitting body 3 are independently molded of a flexible material such as a plastic substance. In the cylindrical body 1, a groove 4 is formed in the axial direction on the outer surface of the body at a position opposite the open cut to form hinge means so as to facilitate the divergence and convergence of the opposed edges across the open cut. The two semicircular portions 1' which are separated from each other by said hinge groove 4 as the borderline have their lower edges extended outwardly to give rise to flange-shaped base plates 5, whose extremities are provided each with a vertical supporting hook 6 possessed of an inwardly bent tip 6'.

By contrast, in the hat-shaped fitting body 3 which is to be set in position on said cylindrical body 1, a flange 7 is disposed extending around the outer surface of the opening and, at the same time, a pair of windows 8 are disposed on the upper side for passage of the core strands b of the cord a.

The strain grommet of the aforementioned description according to the present invention is fastened onto the end portion of the cord a by diverging the opposed edges to widen the open cut of the cylindrical body 1 and encircling said end portion by the cylindrical body, tightening the cylindrical body 1 more or less constrictively around said end portion by bringing into mutual engagement the engaging tip 2 and the stopping hook 2' provided at the opposed edges and thereafter bending the unraveled covering braid c at the end portion of the cord outwardly and neatly pressing said untied braid against the outer surface of the cylindrical body. After that, the end portion of the cord is immobilized between the two bodies described above by setting the hat-shaped fitting body 3 downwardly into position on the cylindrical body, passing the two extended core strands b through the windows 8 and at the same time inserting the fitting body around the cylindrical body having said covering braid c pressed neatly against the outer surface thereof for thereby providing fast hold of the bent covering braid c between the inner wall surface of the fitting body and the outer surface of the cylindrical body and simultaneously bringing the flange 7 formed on the outer surface of the opening into snapping engagement with the supporting hooks 6 raised from the base plates 5 of the cylindrical body for thereby bringing the cylindrical body 1 and the fitting body 3 into unitary engagement.

The cylindrical body and the fitting body which have been coupled to provide fast hold of the end portion of the cord as described above are held in position by being housed in a case 9 or the like which is fastened to the ceiling surface, for example, as illustrated in FIG. 4. The cord is immobilized between the two bodies described above because of the fact that the end portion of the covering braid is interposed and retained between the outer surface of the cylindrical body and the inner wall surface of the fitting body. For this reason, even if the weight of an illuminating appliance, for example, which is attached to the other end of the cord is borne directly by the cord itself, the weight does not have any direct effect upon the core strands of the cord. Furthermore, since the unraveled covering braid at the end portion of the cord is spread outwardly and held fast between the cylindrical body and the fitting body, it no longer requires trimming. And the fact that the portion of the covering braid which escapes being interposed between said two bodies is enclosed within the interior of the fitting body brings about an advantage that the strain grommet of this invention enjoys excellent operational efficiency by obviating the otherwise necessary cutting of stray parts of the braid.

For the purpose of the present invention, said cylindrical body and fitting body are required to be molded in such a way that only a small space is formed between said cylindrical body and fitting body when the two bodies are coupled into fast union, so that the spread portion of the covering braid may be interposed in the formed space. As is plain from the construction of this invention, this space must be narrow enough to ensure fast hold of the spread portion of the covering braid inserted therein.

Although the cylindrical body itself need not be wrapped around the end portion of the cord directly with pressure, it goes without saying that a more effective hold of the cord end can be obtained by molding the cylindrical body in such a way that the cord will be fastened more or less constrictively as indicated above with reference to a preferred embodiment. Even when the cylindrical body is wrapped loosely, the fastened end of the cord is prevented from being released by the eventual insertion of the fitting body onto the cylindrical body. Thus, the engaging tip provided on one of the edges along the open cut is not exposed to any load at all.

As described above, the strain grommet according to the present invention is capable of providing safe and fast hold of the end portion of the cord despite its extremely simple construction and also enjoys notably high operational efficiency by obviating the otherwise necessary treatment for the trimming of the end portion of the cord.

What is claimed is:

1. A two-piece strain relief grommet comprising a generally cylindrical body adapted to encircle a free end portion of a covered electrical cord, said body having one side split in an axial direction and means for permitting said body to flex between open and closed positions, fastening means for maintaining said split side in a closed position, a hollow hat-shaped fitting body accepting said cylindrical body within its cavity, connecting means for mantaining said bodies in telescoped assembled relation, and means providing communication with the interior of said fitting body.

2. A grommet of the type claimed in claim 1 wherein said fastening means is integral with said split side and includes an interlocking tip and stopping hook positioned on opposite sides respectively of said split.

3. A grommet of the type claimed in claim 1 wherein said connecting means includes at least one resilient arm carried by one body and having shoulder means adjacent one end for engaging means on the other body removeably retain them in assembled relation.

4. A grommet of the type claimed in claim 1 wherein said flex means includes a generally axially extending relieved portion in said cylindrical body on the side opposite said split forming a hinge-like bend line.

5. A grommet of the type claimed in claim 1 wherein said communication means includes at least one window port opening through the closed end and side wall of said fitting body.

6. A grommet of the type claimed in claim 5 wherein there are two said ports in spaced relation leaving a central bridging portion in said closed end adapted to accept conductors of a cord in split relation.

7. A grommet of the type claimed in claim 6 wherein said cylindrical body is provided adjacent one end with outwardly extending flange means, said connecting means including at least one resilient shouldered arm upstanding from said flange means in spaced relation to the side of the cylindrical body, said fitting body including flange means engageable by said at least one shouldered arm when said fitting body is telescoped over said cylindrical body.

8. A grommet of the type claimed in claim 7 wherein said grommet is used with a cord having multiple insulated conductors and an outer covering, said interfitting cylindrical body and said fitting body being so dimensioned as to accommodate said cord within said cylindrical body and a portion of said outer covering to be stripped from the conductors and thence reversely bent over the exterior of said cylindrical body and retained in such reversely bent position by said telescoped fitting body's inner surface and accommodating said conductors through said window ports.

* * * * *